UNITED STATES PATENT OFFICE.

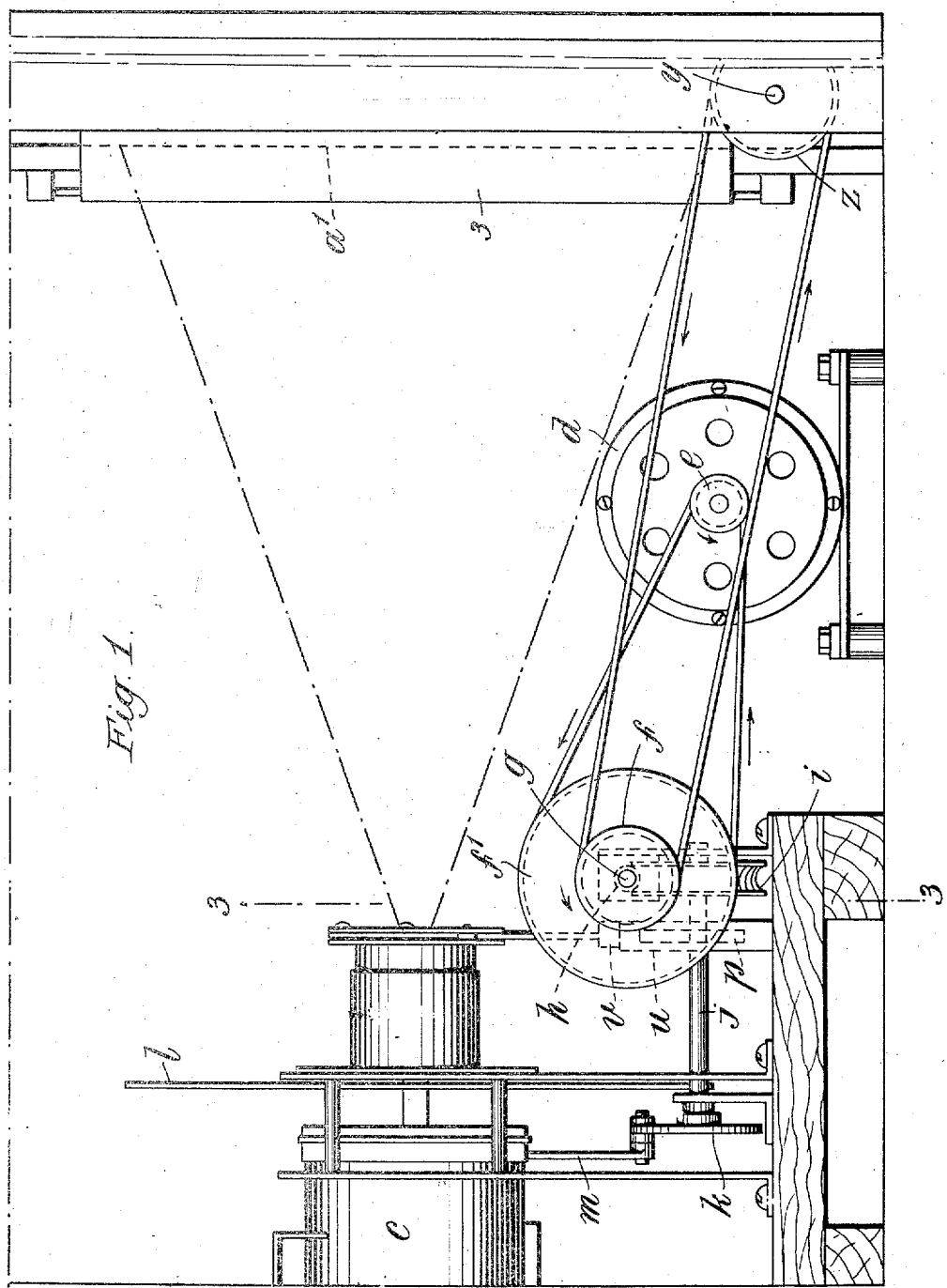

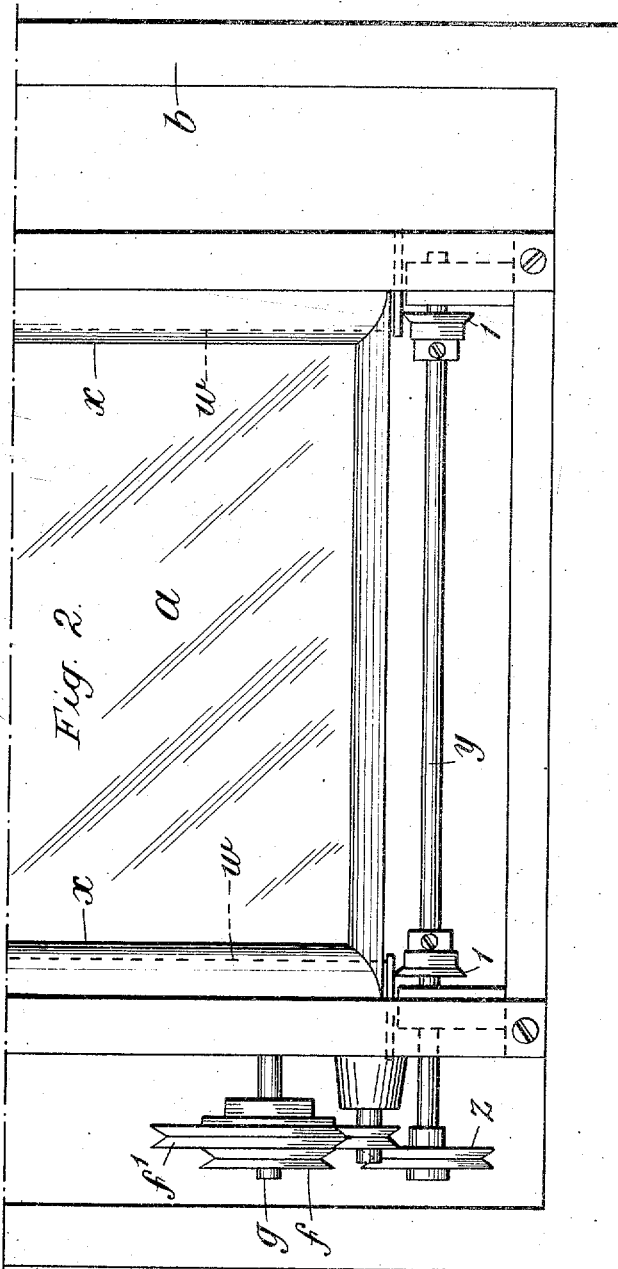
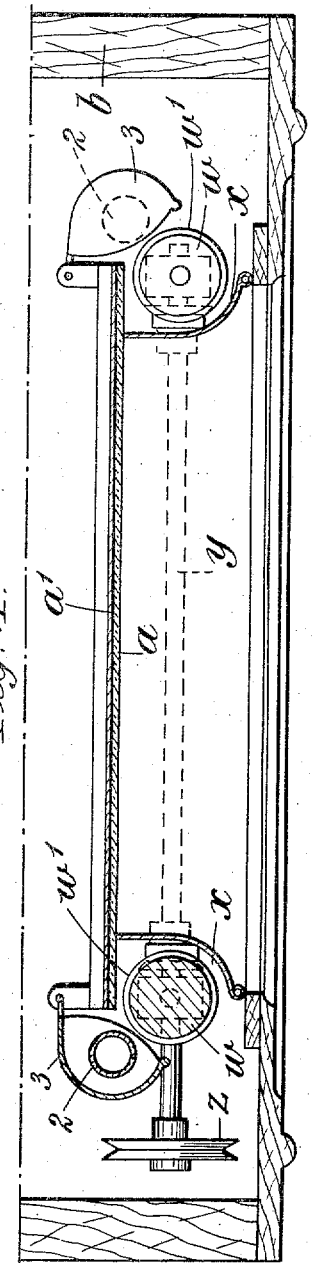

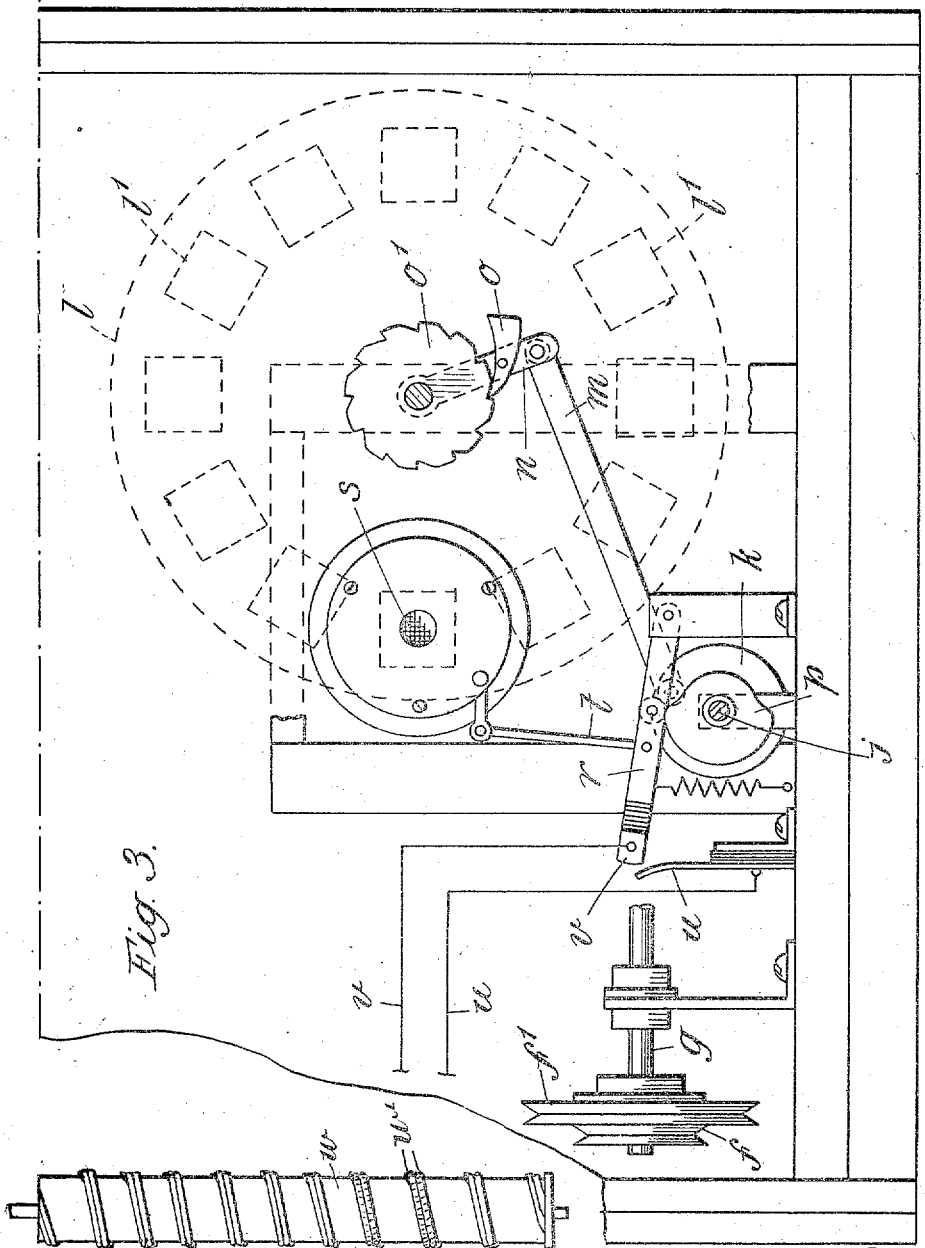

ALBERT HENRY FRANKS PERL, OF LONDON, ENGLAND.

PROJECTION APPARATUS.

962,664.  Specification of Letters Patent.  Patented June 28, 1910.

Application filed January 15, 1910. Serial No. 538,225.

*To all whom it may concern:*

Be it known that I, ALBERT HENRY FRANKS PERL, a subject of His Majesty the King of England, residing at Raymond House, Theobald's Road, Gray's Inn, in the county of London, Kingdom of England, have invented certain new and useful Improvements in and Relating to Projection Apparatus, of which the following is a specification.

This invention relates to improvements in connection with advertising or entertaining and relates more particularly to mirrors or screens used in connection with magic lanterns for receiving pictures or projections.

The invention consists in the arrangement whereby the translucent screen is employed between a transparent mirror and the lantern and in the combination therewith of exterior reflecting devices.

Now according to my invention I provide a frosted glass, paper, or other like translucent screen for receiving the projections or pictures on the inner or lantern side of an inclosed casing and in combination therewith a transparent mirror on the outer or visible side so that the pictures or advertising matter can be effectively thrown on to a screen and will appear clearly through the mirror, while when the screen is darkened or not in use the mirror alone is effective or visible. In combination with the two before-mentioned screens I also employ attractive exterior reflecting devices to be switched into operation at the intervals between the changes of scenes or other advertising matter. These said devices may conveniently be formed as reflecting columns and be revolved to give a translatory or moving effect to the mirror as if the screen were itself being moved.

In the accompanying drawings with reference to which my invention is hereinafter described:—Figure 1 is a side elevation of an advertising or displaying apparatus for use in shop windows or like places, the side of the casing being removed. Fig. 2 is a front elevation thereof, the front frame being removed; Fig. 3 is a sectional front elevation taken partly on the line 3—3 Fig. 1; Fig. 4 is a part sectional plan of the mechanism shown in Fig. 2; Fig. 5 is a detached view of one of my preferred forms of revolving column used in conjunction with the apparatus.

In carrying my invention into practice as illustrated in Figs. 1 to 5 of the drawings, I mount a mirror $a$ and screen $a'$ so as to form one side or end of a box or casing $b$, the transparent mirror of course being outermost. A magic lantern $c$ is arranged at the opposite end of the casing and the pictures or advertisements are projected on to the screen $a'$ and automatically changed periodically by convenient electric clockwork or other driving gear, that shown being electric.

The changing mechanism as shown comprises a suitable motor $d$ arranged within the casing $b$ and having a pulley wheel $e$ on its shaft by means of which the double pulley wheel $f\ f'$ is rotated. These wheels are keyed on a shaft $g$ which by means of suitable worm gear $h$ rotates the wheel $i$ and shaft $j$. To the outer end of this shaft $j$ is keyed a crank disk $k$ which actuates the revolving disk $l$ carrying the slides $l'$ by means of a connecting rod $m$, reciprocating or swinging arm $n$, weighted pawl $o$ and ratchet wheel $o'$ in the well known manner. Also secured on this shaft $j$ is a cam $p$ that actuates a spring controlled lever $r$ operating the shutter $s$ by means of a rod $t$, and in addition serves to open and close the lamp circuit $u\ v$.

The screen $a'$ itself could conveniently be made of thin paper, opal glass or any other material that would serve the purpose and at the same time be sufficiently transparent to allow the rays of light to pass to the mirror $a$. If desired semi-transparent paint might be used on the mirror itself or on a separate sheet of glass.

The exterior reflecting devices employed comprise a pair of spirally wound vertical columns $w\ w$ placed one on either side of the mirror; these are partly inclosed or shielded by silvered reflecting surfaces $x$ that abut against the surface of the mirror $a$ along their inner edges. The columns are driven by means of a cross shaft $y$ and pulley $z$ from the wheel $f$. Wheels or disks $l$ are mounted on the shaft $y$ and the columns $w$ are guided in suitable supports and rest upon the wheels $l$ being rotated thereby. The columns as shown are spirally wound with double rows of colored beads or imitation stones $w'$ which reflect the light given out by a pair of adjacently situated elongated electric incandescent lamps 2, the reflected rays passing between the edges of the reflectors $x$ and the silvered back of the glass

*a*. Reflectors 3 are provided for the lamps 2 to keep the light from the interior of the casing *b*. The revolving columns produce a translatory effect upon the glass *a*. These devices are automatically brought into operation by means of a switch circuit (*u v*) alternately with the reflection of the lantern, or if desired at the end of a series or set of pictures or displays, and are arranged, if required, to work at varying speeds.

It will be seen that I am enabled to provide an efficient mirror and at the same time a practically perfect screen while also providing a novel and effective method of attracting attention.

What I claim and desire to secure by Letters Patent of the United States is:—

1. In a magic lantern apparatus for use in connection with advertising or entertaining, the combination with a magic lantern of a transparent mirror, a translucent screen between the mirror and the lantern for receiving the projections and exterior reflecting devices adapted to be brought into operation alternately with the projections of the magic lantern.

2. A magic lantern apparatus for use in connection with advertising or entertaining comprising a magic lantern having a rotary slide disk in combination with a box or casing, a transparent mirror at one end thereof, a screen for receiving the projections from the magic lantern, means for intermittently rotating said slide disk and changing the pictures thereon, and a plurality of interconnected exterior reflecting columns adapted to be brought into operation alternately with the projections of the lantern.

In testimony that I claim the foregoing as my invention, I have signed my name in presence of two subscribing witnesses.

ALBERT HENRY FRANKS PERL.

Witnesses:
J. M. WILSON,
J. S. ARTHERS.